(12) United States Patent
Hummel

(10) Patent No.: US 6,899,531 B2
(45) Date of Patent: May 31, 2005

(54) SECONDARY AIR TURBOCHARGER WITH SOUND ABSORBING INSULATING MATERIAL

(75) Inventor: Karl-Ernst Hummel, Bietigheim-Bissingen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/719,027

(22) Filed: Nov. 24, 2003

(65) Prior Publication Data

US 2004/0163390 A1 Aug. 26, 2004

(30) Foreign Application Priority Data

Nov. 25, 2002 (DE) .......................... 102 54 859

(51) Int. Cl.⁷ .......................... F04B 17/00; F16D 31/02
(52) U.S. Cl. .......................... 417/407; 417/406; 60/397; 415/177; 415/119
(58) Field of Search .................. 417/407, 406; 60/602, 396, 397; 415/119, 406, 177, 178, 175

(56) References Cited

U.S. PATENT DOCUMENTS

| | | | | |
|---|---|---|---|---|
| 3,059,415 A | * | 10/1962 | Birmann | 417/406 |
| 3,256,689 A | * | 6/1966 | Zeek | 60/39.512 |
| 3,310,940 A | * | 3/1967 | Oetliker | 415/177 |
| 3,845,619 A | * | 11/1974 | O'Neill | 415/177 |
| 3,849,022 A | * | 11/1974 | Amann et al. | 415/178 |
| 3,928,963 A | * | 12/1975 | Devers et al. | 415/178 |
| 4,504,188 A | * | 3/1985 | Traver et al. | 415/119 |
| 4,508,486 A | * | 4/1985 | Tinker | 415/119 |
| 5,199,846 A | * | 4/1993 | Fukasaku et al. | 415/119 |
| 2004/0109759 A1 | * | 6/2004 | Korner | 60/602 |

FOREIGN PATENT DOCUMENTS

| | | | | |
|---|---|---|---|---|
| DE | 24 46 834 A1 | * | 4/1976 | F02C/7/24 |
| DE | 123140 A | * | 11/1976 | F01D/25/08 |
| DE | 10022052 C2 | | 3/2001 | F02C/6/12 |
| JP | 60033000 A | * | 2/1985 | F04D/29/66 |
| WO | WO-97 48943 A1 | | 12/1997 | F16L/59/18 |

* cited by examiner

Primary Examiner—Thai-Ba Trieu
(74) Attorney, Agent, or Firm—Crowell & Moring LLP

(57) ABSTRACT

A secondary air induction system (1) for an internal combustion engine of a motor vehicle, including a turbine (2) and a compressor (3), in which a turbine wheel (4) of the turbine (2) and a compressor wheel (5) of the compressor (3) are mounted on a rotatable common shaft (6) supported by a bearing assembly (8) including at least one roller bearing (17) inside a turbocharger housing (7). An insulating or noise damping material (9) externally encloses at least a portion of the housing (7) to provide sound insulation in the area of the bearing assembly (8).

10 Claims, 2 Drawing Sheets

SECONDARY AIR TURBOCHARGER WITH SOUND ABSORBING INSULATING MATERIAL

BACKGROUND OF THE INVENTION

The present invention relates to a secondary air induction system for an internal combustion engine of a motor vehicle comprising a turbine and a compressor, with a turbine wheel of the turbine and a compressor wheel of the compressor rotatably mounted on a common shaft inside a turbocharger housing.

As a rule, turbocharger comprise two flow machines, namely, a turbine and a compressor, which are mounted on a common shaft. An air or gas stream produced as a result of a pressure difference drives the turbine, which in turn drives the compressor, which draws in air and pre-compresses it. The shaft is normally supported by oil lubricated friction bearings.

To prevent problems during cold start and in a warm-up period of internal combustion engines in motor vehicles, the engines are provided with secondary air induction systems in the form of turbocharger. The turbine of the secondary air induction system is driven, for example, by the pressure difference across a throttle valve in an air intake channel of the internal combustion engine. The turbine, in turn, drives the compressor, which is used to introduce fresh air into the exhaust system of the internal combustion engine. The oxygen content in the fresh air stream leads to an oxidation of the pollutants in the exhaust system. In addition to the resulting removal of pollutants, the thermal energy released during oxidation heats the catalytic converter more quickly to the desired operating temperature.

With systems becoming increasingly complex and undesirably heavy and limited space available in the engine compartment, a suitable secondary air induction system must be small and light. To achieve a sufficient degree of effectiveness, it must be designed to operate at a high speed. This is associated with undesirably high noise generation In addition, the shaft bearings for the turbocharger should be independent of external lubrication.

SUMMARY OF THE INVENTION

Accordingly, it is an object of the invention to provide an improved secondary air induction system for an internal combustion engine of a motor vehicle.

Another object of the invention is to provide a secondary air induction system which has a compact, lightweight construction.

A further object of the invention is to provide a secondary air induction system which can operate at a lower noise level.

These and other objects are achieved in accordance with the present invention by providing a secondary air turbocharger for an internal combustion engine of a motor vehicle, the turbocharger comprising a turbine and a compressor, wherein a turbine wheel of the turbine and a compressor wheel of the compressor are mounted on a rotatable common shaft supported by a bearing assembly inside a turbocharger housing; the bearing assembly comprising at least one roller bearing, and at least a portion of the housing being enclosed externally in the area of the bearing assembly by a sound absorbing insulating material.

To this end, a secondary air induction system is proposed having a shaft supported by at least one roller bearing and a housing which is at least partially enclosed externally in the bearing area by a sound insulating or damping material that absorbs noise. Turbochargers make a considerable amount of noise. This is particularly true if the common shaft is supported by roller bearings, which are preferred for secondary air induction systems. It has been discovered that providing an insulating material on the outside, at least in the area of the roller bearing assembly, dampens the noise very effectively. The housing of the turbocharger can tightly enclose the turbine, the compressor and the bearing assembly and can be constructed with thin walls. This provides a space and weight saving structure. Because of the typically complex shape of the housing, the insulating material can be primarily disposed in corresponding recesses. As a result, the insulating material does not substantially add to the overall volume. Existing turbocharger designs can be retrofitted to include the sound absorbing design according to the invention without requiring any structural changes.

Closer investigation has shown that the main source of the noise is the shaft bearing. The arrangement of a secondary air induction system remote from the engine lubricating oil circuit leads to the bearing assembly being constructed with lifetime-lubricated roller bearings, e.g. ball bearings, the rolling noise of which contributes substantially to noise generation.

In one advantageous embodiment of the invention in which the housing is surrounded in the bearing area by insulating material, a surprisingly significant reduction in noise level is achieved. Particularly if the housing has a smaller diameter in the area of the bearing assembly than in the area of the turbine and the compressor, it is advantageous to enclose the area of the bearing assembly between the turbine and the compressor with insulating material. In addition to providing effective damping of the bearing noise, this arrangement also provides at least partial damping of the turbine and compressor noise. Filling the space between the turbine and the compressor with insulating material does not enlarge the overall contour of the turbocharger, so that no additional installation space is required.

In an advantageous further embodiment of the invention the housing is enclosed with insulating material in the area of the turbine and/or the compressor. It has been found that in addition to the bearing noise, the aerodynamic noise of the high-speed turbine or the compressor contributes significantly to the operating noise of the turbocharger. Arranging the insulating material on the outside of this area substantially reduces the noise level even if the walls of the housing are thin.

In an advantageous further embodiment of the invention, the housing is at least substantially completely enclosed with insulating material in the area of the bearing assembly, the turbine and the compressor. As a result, the entire turbocharger is at least substantially completely externally encapsulated. The outer contour of the insulating material needs to be only slightly larger than the outer contour of the housing. The complex outer shape nevertheless offers many spaces that can be filled with insulating material. Despite the high noise damping effect, the outer contour and thus the required overall structural volume are not significantly increased.

All of the embodiments according to the invention have in common that in addition to the actual insulation provided by the insulating material in which the sound energy is dissipated in the material itself, the insulating material also prevents natural vibration of parts of the housing wall. As a result, the housing of the turbocharger can have very thin walls to save material and can be light in weight, without wall vibrations increasing the noise level.

A suitable noise damping material has been found to be a synthetic resin form, e.g., a polyurethane (PU) foam. Advantageously, the synthetic resin foam is provided with sound absorbing fillers. Such a foam has a good damping effect and can be readily processed using simple and inexpensive tools. Alternatively, glass fibers and/or mineral fibers, such as mineral wool or the like, may be used as noise damping materials.

In one advantageous further embodiment of the invention, a shell encloses the insulating material on the outside. This shell can provide an additional noise damping effect. The shell moreover protects the insulating material, which may be quite soft, against damage. Advantageously, the shell also can function as a mold into which the polyurethane foam is injected. As the polyurethane foam cures, it firmly bonds to the shell, so that the shell serves as a "lost" mold. This eliminates the need for an additional mold and saves costs. As an alternative, it may also be advantageous to place the turbocharger into a suitable mold without a shell and to inject the polyurethane foam around it.

The shell advantageously is comprised of two interconnectable half shells. This makes it easier to mount the shell to the fully assembled turbocharger. In particular, the two half shells may be constructed as a one-piece component and are provided with a film hinge in the area of a parting line and with at least one snap connector in the area of the opposite parting line. The shell is advantageously made of synthetic resin material (i.e., plastic), particularly by injection molding. This facilitates assembly, which can be done manually or automatically by shutting the open half shells around the turbocharger housing with the aid of the film hinge and closing them with the snap connectors. The film hinge simultaneously forms a seal against polyurethane foam leakage without adding to the complexity of the structure.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
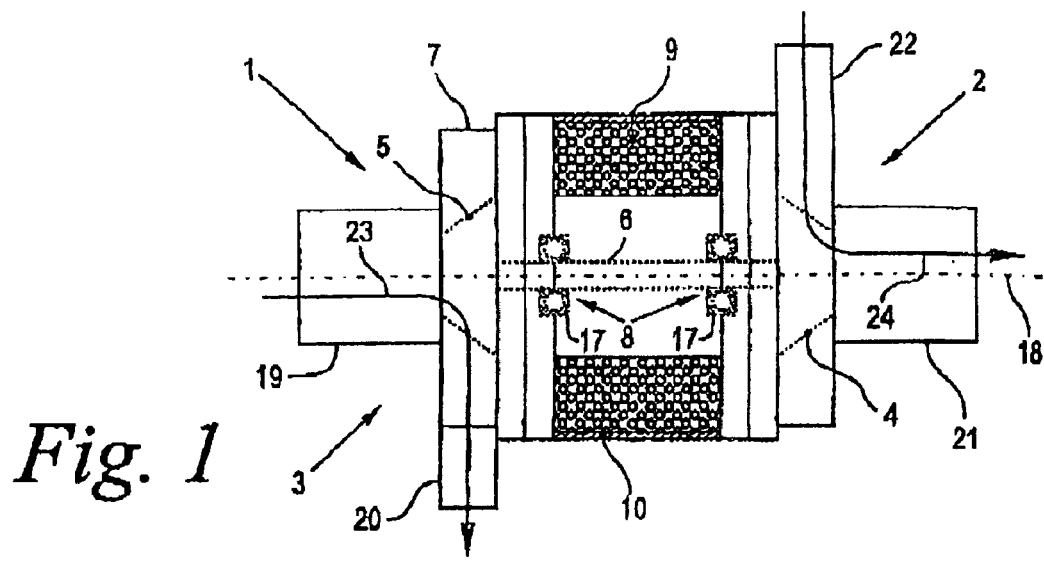
FIG. 1 is a schematic partially cut-away view of a turbocharger provided as a secondary air induction system, with a foam cover enclosing the area of the bearing assembly between the turbine and the compressor.

FIG. 1 is a schematic, partially cut-way view of a secondary air induction system 1 for an internal combustion engine of a motor vehicle comprising a turbine 2, a compressor and a housing 7. A turbine wheel 4 of the turbine 2, a compressor wheel 5 of the compressor 3, a shaft 6 and a bearing assembly 8 are arranged inside the housing 7, as indicated by broken line. The turbine wheel 4 and the compressor wheel 5 are mounted on the common shaft 6 so as to be rotatable together about an axis 18 with the aid of the bearing assembly 8. In the illustrated embodiment, the bearing assembly 8 is formed by two lifetime-lubricated ball bearings 17.

In the area of the turbine 2, the housing 7 encloses the turbine wheel 4, in the area of the compressor 3 the compressor wheel 5, and in the area of the bearing assembly 8 the ball bearings 17 and the shaft 6. In the area of the turbine 2, the housing also has an inlet tube 22 and an outlet tube 21. In the area of the compressor 8, an inlet tube 19 and a discharge tube 20 are provided on the housing 7.

The turbine 2 is connected with an intake tract of the internal combustion engine (not shown), such that a pressure difference created across a throttle valve causes a partial air stream to flow through the turbine 2 as generally indicated by arrow 24 and thereby rotatably drives the turbine wheel 4. The rotation of the turbine wheel 4 is transmitted via the shaft 6 to the compressor wheel 5, such that a secondary air stream is drawn into the inlet tube 19 and propelled out of te discharge tube 20 as generally indicated by arrow 23 toward an engine exhaust system (not shown).

A portion of the housing 7 is provided externally with an insulating material 9 for sound absorption. The housing 7 has a smaller diameter in the area of the bearing assembly 8 than in the area of the turbine 2 and the compressor 3. The housing 7 is enclosed with the insulating material 9 in the area of the bearing assembly 8 between the turbine 2 and the compressor 8. The insulating material 9, in turn, is enclosed on the outside by an annular hell 10 located between the turbine 2 and the compressor 3.

In the illustrated embodiment, the insulating material 9 comprises a polyurethane foam that is provided with sound-absorbing fillers. It is also possible to use an insulating material 9 that contains glass fibers and/or mineral fibers.

Figure 2:
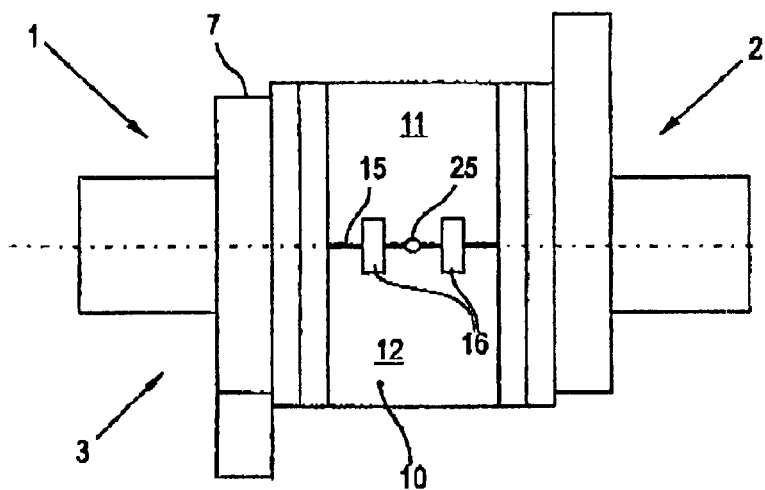
FIG. 2 is an interior view of the arrangement depicted in FIG. 1, including the details of a shell enclosing the insulating material.

FIG. 2 is an exterior view of the arrangement depicted in FIG. 1, according to which the shell 10 is constructed of two half shells 11 and 12. The two half shells 11 and 12 are joined along a parting line 15 by snap connectors 16. In the area of the parting line 15 an injection opening 25 is provided for injecting the polyurethane foam used as the insulating material 9 (FIG. 1). The shell 10 serves as a "lost" injection mold for injection molding of the polyurethane foam.

Figure 3:
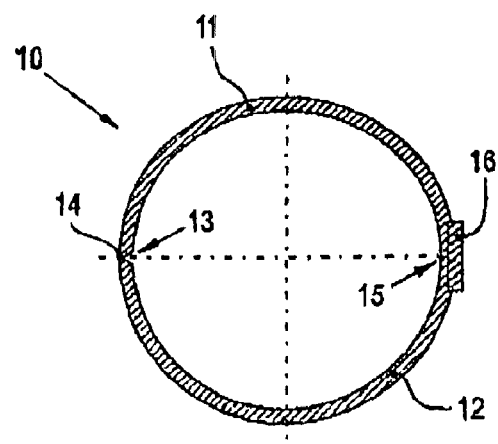
FIG. 3 is a cross-section view of shell depicted in FIG. 2.

FIG. 3 is a cross-sectional view showing details of the shell 10 according to FIGS. 1 and 2. The two half shells 11 and 12 are formed as one-piece or integral component and are pivotably interconnected by a film hinge 14 in the area of a parting line 13 opposite the parting line 15. The two half shells 11 and 12, the film binge 14 and the snap connectors 16 are produced as a one-piece injection-molded synthetic resin component.

When the snap connectors 16 are open, the two half shells 11 and 12 can be pivoted in relation to one another. When folded open, the two half shells 11 and 12 can be disposed around the housing 7 of the secondary air induction system 1 (FIGS. 1 and 2). Folding the two half shells 11 and 12 together and closing the snap connectors 16 creates a substantially tight mold for the polyurethane foam surrounding the area of the bearing assembly 8 (FIG. 1).

Figure 4:
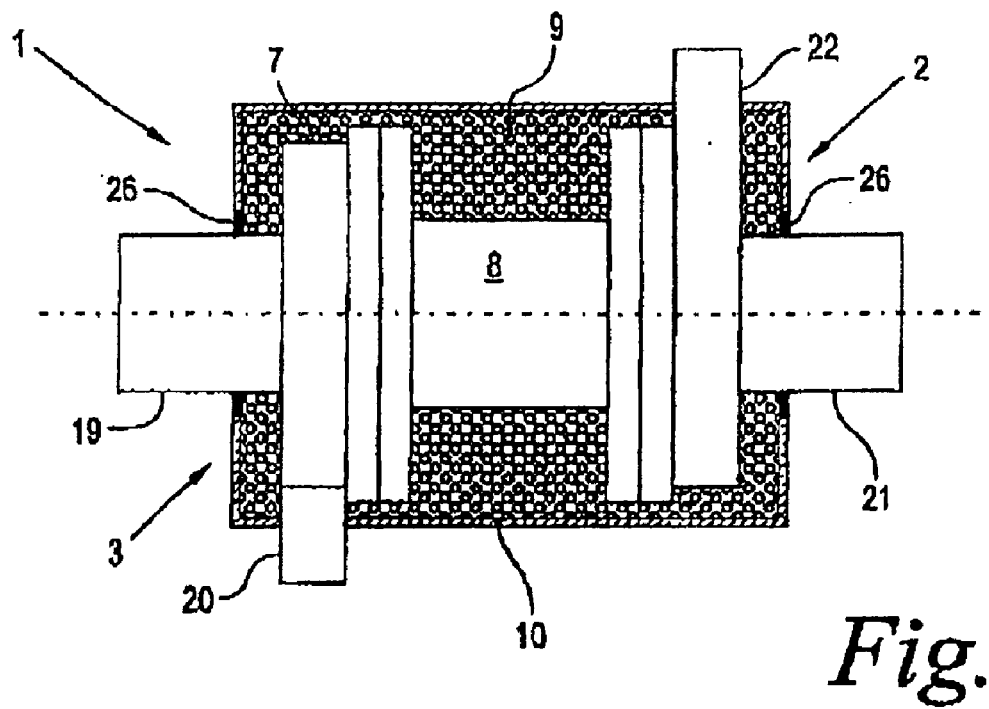
FIG. 4 is a partially cut-away view of a variant of the arrangement shown in FIG. 1 with an insulating material which substantially completely encloses the housing of the turbocharger.

FIG. 4 shows a schematic partially cut-away view of a variant of the arrangement according to FIGS. 1 to 3 in which the housing 7 is at least substantially completely enclosed by the insulating material 9 in the area of the bearing assembly 8, the turbine 2 and the compressor 3. The insulating material 9 is enclosed radially on the outside and also on its end faces by a correspondingly shaped substantially cylindrical shell 10. Only the inlet tube 19, the discharge tube 20, the outlet tube 21 and the inlet tube 22 protrude from the insulating material 9 or the shell 10. Suitable annular seals 26 may be provided to seal the shell 10 relative to the inlet tube 19 and the outlet tube 21.

Figure 5:
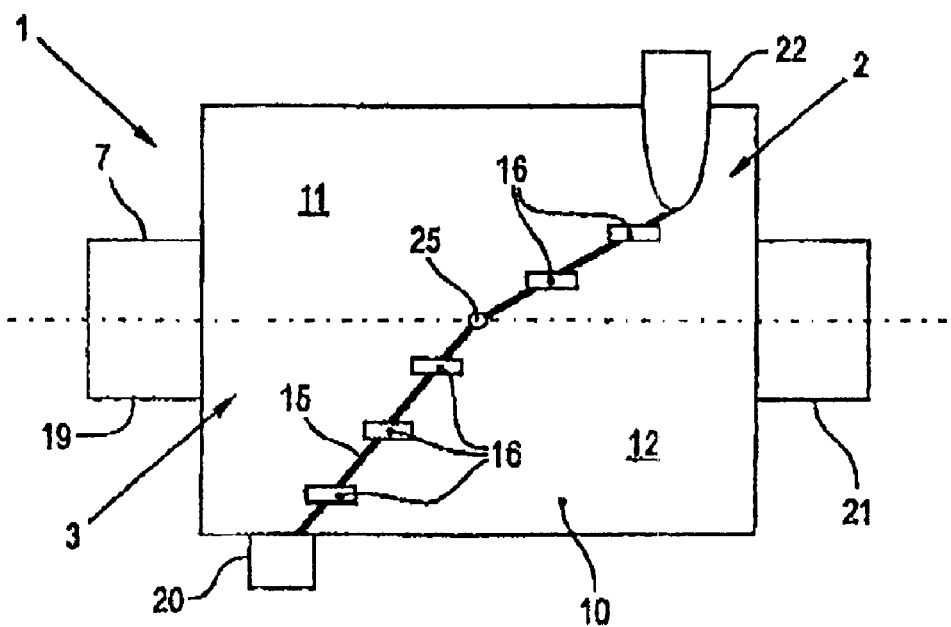
FIG. 5 is an exterior view of the arrangement depicted in FIG. 4, showing details of the shell enclosing the insulating material.

FIG. 5 is an exterior view of the arrangement depicted in FIG. 4, according to which the two half shells 11 and 12 are joined by a plurality of snap connectors 16 along a parting line 15 extending diagonally and at an angle from the discharge connection 20 to the injection connection 22.

With respect to the remaining features and reference numerals, the arrangement shown in FIGS. 4 and 5 corresponds to that shown in FIG. 1 through 3.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A secondary air turbocharger for an internal combustion engine of a motor vehicle, said turbocharger comprising a turbine and a compressor, wherein a turbine wheel of the turbine and a compressor wheel of the compressor are mounted on a rotatable common shaft supported by a bearing assembly inside a turbocharger housing, said bearing assembly comprising at least one roller bearing, and at least a portion of the housing being enclosed externally in the area of the bearing assembly by a sound absorbing insulating material of synthetic resin foam for noise suppression.

2. A secondary air turbocharger according to claim 1, wherein the turbocharger housing has a smaller diameter in the area of the bearing assembly than in the area of the turbine and the compressor, and the insulating material encloses the area of the bearing assembly between the turbine and the compressor.

3. A secondary air turbocharger according to claim 2, wherein said synthetic resin foam is a polyurethane foam.

4. A secondary air turbocharger according to claim 1, wherein the insulating material contains at least one fiber selected from the group consisting of glass fibers and mineral fibers.

5. A secondary air turbocharger according to claim 1, further comprising a shell externally enclosing the insulating material.

6. A secondary air turbocharger according to claim 5, wherein the shell is provided as a mold into which a synthetic resin foam is injected.

7. A secondary air turbocharger according to claim 6, wherein the shell comprises two interconnectable half shells.

8. A secondary air turbocharger according to claim 7, wherein the two half shells are constructed as a one-piece, injection-molded synthetic resin component and are joined by a film hinge in the area of a parting line and have at least one snap connector in the area of an opposite parting line.

9. A secondary air turbocharger for an internal combustion engine of a motor vehicle, said turbocharger comprising a turbine and a compressor, wherein a turbine wheel of the turbine and a compressor wheel of the compressor are mounted on a rotatable common shaft supported by a bearing assembly inside a turbocharger housing; said bearing assembly comprising at least one roller bearing, at least a portion of the housing being enclosed externally in the area of the bearing assembly by a sound absorbing insulating material, and wherein the insulating material at least substantially completely encloses the housing in the area of the turbine, the bearing assembly and the compressor.

10. A secondary air turbocharger for an internal combustion engine of a motor vehicle, said turbocharger comprising a turbine and a compressor, wherein a turbine wheel of the turbine and a compressor wheel of the compressor are mounted on a rotatable common shaft supported by a bearing assembly inside a turbocharger housing; said bearing assembly comprising at least one roller bearing, at least a portion of the housing being enclosed externally in the area of the bearing assembly by a sound absorbing insulating material, and wherein the synthetic resin foam contains at least one sound absorbing filler.

* * * * *